(12) United States Patent
Garofalo et al.

(10) Patent No.: US 11,779,870 B2
(45) Date of Patent: Oct. 10, 2023

(54) SMART FILTER ELEMENTS AND SYSTEMS

(71) Applicant: MAHLE International GmbH, Stuttgart (DE)

(72) Inventors: Aaron Garofalo, Clinton Township, MI (US); Luke Harrison, Shelby Township, MI (US)

(73) Assignee: MAHLE International GmbH, Stuttgart (DE)

( * ) Notice: Subject to any disclaimer, the term of this patent is extended or adjusted under 35 U.S.C. 154(b) by 391 days.

(21) Appl. No.: 17/111,568

(22) Filed: Dec. 4, 2020

(65) Prior Publication Data
US 2022/0176294 A1 Jun. 9, 2022

(51) Int. Cl.
| | |
|---|---|
| *B01D 46/00* | (2022.01) |
| *B01D 46/42* | (2006.01) |
| *B01D 39/16* | (2006.01) |
| *B01D 46/24* | (2006.01) |
| *B60H 3/06* | (2006.01) |
| *B01D 46/44* | (2006.01) |

(52) U.S. Cl.
CPC ......... *B01D 46/0086* (2013.01); *B01D 39/16* (2013.01); *B01D 46/0005* (2013.01); *B01D 46/2403* (2013.01); *B01D 46/429* (2013.01); *B01D 46/446* (2013.01); *B60H 3/0658* (2013.01); *B01D 2279/40* (2013.01)

(58) Field of Classification Search
CPC ............. B01D 46/0086; B01D 46/429; B01D 46/0005; B01D 46/2403; B01D 46/446; B01D 2279/40; B01D 39/16; B01D 46/24; B01D 46/2411; B01D 46/2414; B60H 3/0658
See application file for complete search history.

(56) References Cited

U.S. PATENT DOCUMENTS

| | | |
|---|---|---|
| 7,493,820 B2 | 2/2009 | Mossman |
| 7,898,495 B2 | 3/2011 | Burke et al. |
| 8,007,568 B2 | 8/2011 | DiLeo et al. |
| 8,313,567 B2 | 11/2012 | Sullivan |

(Continued)

FOREIGN PATENT DOCUMENTS

| | | |
|---|---|---|
| DE | 19841814 A1 | 3/2000 |
| DE | 102005027072 A1 | 12/2006 |

(Continued)

OTHER PUBLICATIONS

Machine Translation of FR 3087352A1 (Year: 2020).*

(Continued)

*Primary Examiner* — Robert Clemente
(74) *Attorney, Agent, or Firm* — Dickinson Wright PLLC

(57) ABSTRACT

A system is provided for monitoring the condition of a filter incorporated into a vehicle or other apparatus in order to identify when the filter should be cleaned or replaced is provided. This system generally comprises a receiving device and a smart filter element. The smart filter element a filter media having a first side and a second side; a frame comprising a plurality of walls that surrounds at least a portion of the screen; and a sensor configured to gauge pressure and to communicate wirelessly with the receiving device. The sensor being located approximate to the second side of the filter media.

18 Claims, 11 Drawing Sheets

(56) References Cited

U.S. PATENT DOCUMENTS

| | | | |
|---|---|---|---|
| 8,617,278 B2 * | 12/2013 | Sullivan | B01D 46/4227 96/429 |
| 8,657,936 B2 * | 2/2014 | Sullivan | B01D 46/42 96/417 |
| 8,701,473 B2 | 4/2014 | Uehara | |
| 8,942,883 B2 | 1/2015 | Dlugoss et al. | |
| 9,375,669 B2 * | 6/2016 | Spiegel | B01D 46/22 |
| 10,065,143 B2 | 9/2018 | Beier | |
| 10,119,886 B2 | 11/2018 | Dhingra et al. | |
| 10,162,372 B2 | 12/2018 | Oakes | |
| 2007/0240578 A1 | 10/2007 | DiLeo | |
| 2007/0241510 A1 | 10/2007 | DiLeo | |
| 2009/0211455 A1 * | 8/2009 | Gunther | B01D 46/0086 96/407 |
| 2015/0153317 A1 | 6/2015 | Krebs | |
| 2017/0048709 A1 | 2/2017 | Patel et al. | |
| 2017/0340996 A1 | 11/2017 | Jo et al. | |
| 2018/0024725 A1 | 1/2018 | Penilia et al. | |
| 2018/0095742 A1 | 4/2018 | Richter et al. | |
| 2018/0133639 A1 | 5/2018 | Reid et al. | |
| 2018/0140989 A1 | 5/2018 | Arthur et al. | |
| 2018/0144559 A1 | 5/2018 | Hukill et al. | |
| 2018/0335368 A1 | 11/2018 | Dhingra et al. | |
| 2019/0001250 A1 | 1/2019 | Moredock et al. | |
| 2019/0015768 A1 * | 1/2019 | Aiderman | G01F 1/075 |
| 2019/0054411 A1 | 2/2019 | Miller et al. | |
| 2019/0090036 A1 | 3/2019 | Scope et al. | |
| 2019/0153971 A1 | 5/2019 | Prabhala et al. | |
| 2021/0086124 A1 * | 3/2021 | Peltz | B01D 46/442 |
| 2021/0252443 A1 * | 8/2021 | Ramphal | B01D 46/10 |
| 2023/0033140 A1 * | 2/2023 | Jupudi | B01D 46/62 |

FOREIGN PATENT DOCUMENTS

| | | | |
|---|---|---|---|
| DE | 102016113038 A1 | | 2/2017 |
| DE | 102018104129 U1 | | 8/2018 |
| DE | 102017210270 A1 * | 12/2018 | |
| EP | 3417926 A1 | | 12/2018 |
| FR | 3087352 A1 * | 4/2020 | B01D 46/0086 |
| WO | 2005113112 A1 | | 12/2005 |
| WO | 2009033923 A2 | | 3/2009 |
| WO | 2012071026 A1 | | 5/2012 |
| WO | 2016058672 A1 | | 4/2016 |
| WO | 2018156709 A1 | | 8/2018 |

OTHER PUBLICATIONS

Machine Translation of DE 102017210270A1 (Year: 2018).*
Ivana Ignjatovic, et al., "Wireless Sensor System for Monitoring of Compressed Air Filters," Journal of Scientific & Industrial Research, vol. 71, May 2012, pp. 334-340 (7 pages).

* cited by examiner

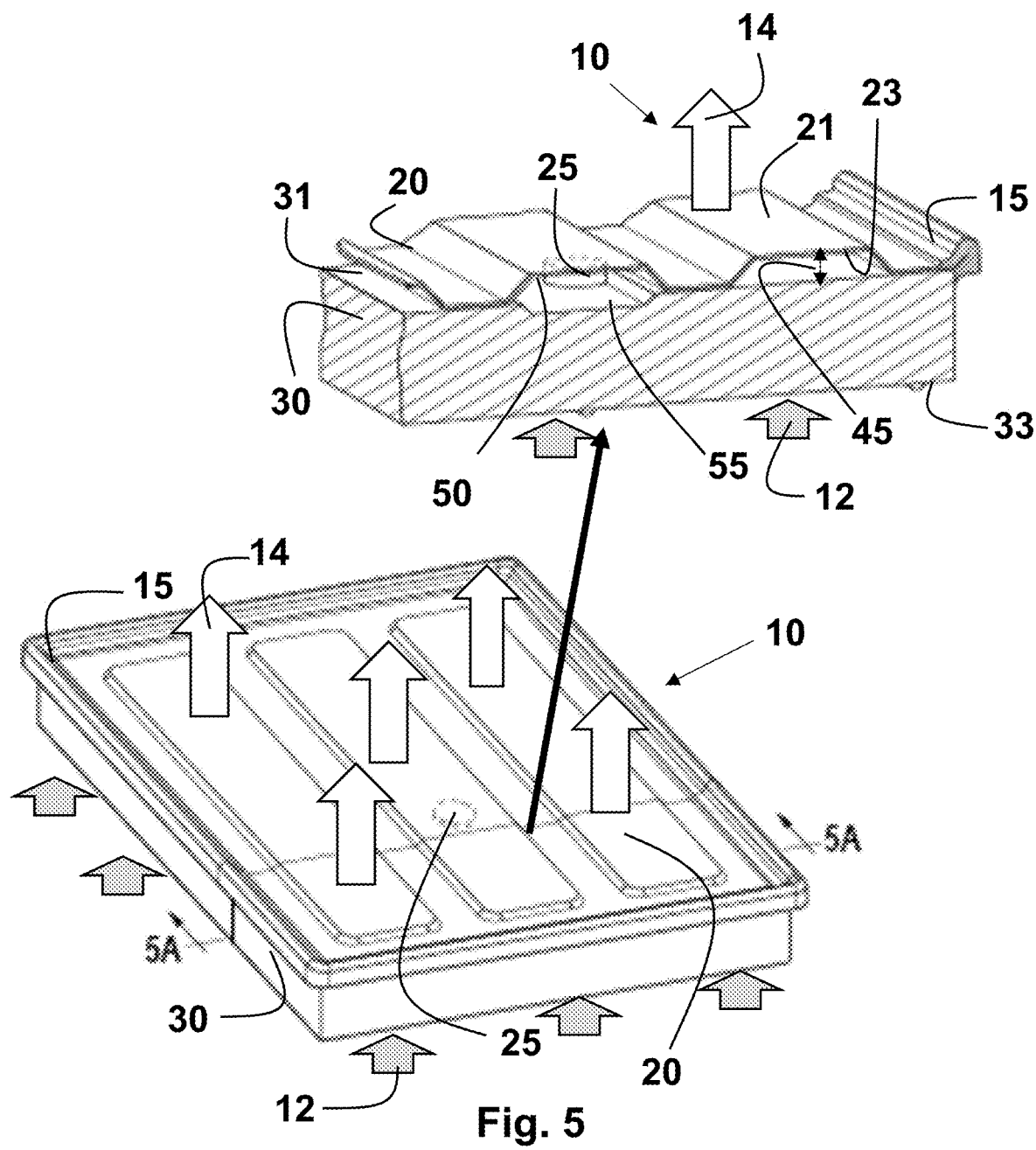

SMART FILTER ELEMENTS AND SYSTEMS

FIELD

This disclosure relates generally to sensors for use in conjunction with a smart filter element in a vehicle or other apparatus. This disclosure further relates to a system that incorporates the smart filter element with a receiving device for monitoring and determining the useful lifetime of the filter element.

BACKGROUND

The statements in this section merely provide background information related to the present disclosure and may not constitute prior art.

Filters are used in a variety of applications in which an apparatus or machine, such as an appliance or a vehicle, operates or is exposed to an unclean or dirty environment or atmosphere. The filter allows a fluid from the atmosphere or environment, such as a gas (e.g., air) or a liquid, to pass through the filter, while trapping particulate matter, which, if allowed to pass through, might negatively impact performance of the machine or apparatus (e.g., a vehicle), even damaging it.

The accumulation of filtered material in the filter may force the apparatus or machine to operate with less-than-desired efficiency, or in some cases cause it to cease operation entirely. Therefore, in many instances, filters need to be routinely inspected and replaced. However, the need to change a filter is difficult for an individual to assess from simple visual inspection, and in fact the state of a particular filter is often not assessable while the filter is in operation. Therefore, in many cases a rule-of-thumb has been developed in order to provide a time interval at the end of which the filter is expected to be replaced. For instance, some filters are provided with instructions for their replacement after a certain number of months or years, or after a certain amount of use has occurred (e.g., after a vehicle has been driven a specific distance). Often this rule-of-thumb will lead to an individual incurring unnecessary cost by changing a filter before it has reached its useful lifetime. In other cases, the appliance or vehicle may be operated for a period of time at less than desirable efficiency due to the filter becoming clogged or plugged.

SUMMARY

The present disclosure generally provides a smart filter element. This smart filter element generally comprises: a filter media having a first side and a second side; wherein the first side includes a length and a width that defines an external border for the filter media; a frame comprising a plurality of walls, the frame surrounding at least a portion of the filter media; and a sensor configured to measure a filter variable, such as gauge pressure and to communicate wirelessly with a receiving device, the sensor being located approximate to the second side of the filter media.

According to another aspect of the present disclosure, a system for monitoring the condition of a filter incorporated into a vehicle or other apparatus in order to identify when the filter should be cleaned or replaced is required. This system generally comprises a receiving device and the smart filter element as described above and further defined herein. The receiving device is configured to synchronize with the sensor of the smart filter element and receive data therefrom; the receiving device includes a software application (APP) that compares the data received at any given time against the initial baseline pressure loss measurement in order to determine the filter element's remaining lifetime.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a perspective view and a cross-sectional view of a smart filter element taken at plane 5A that shows a sensor mounted to the first side (i.e., underside) of a screen thereof according to another aspect of the present disclosure wherein the media is embossed;

Figure 7A:
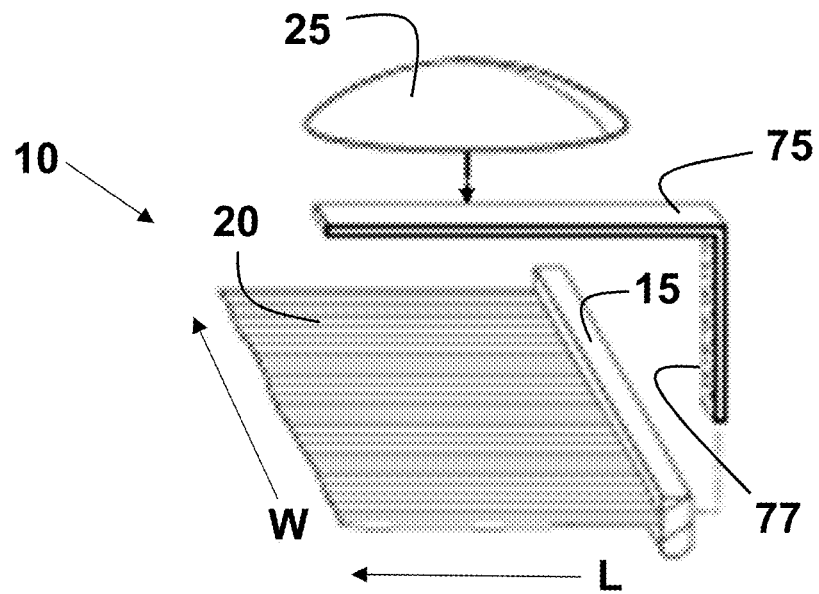
Figure 7B:
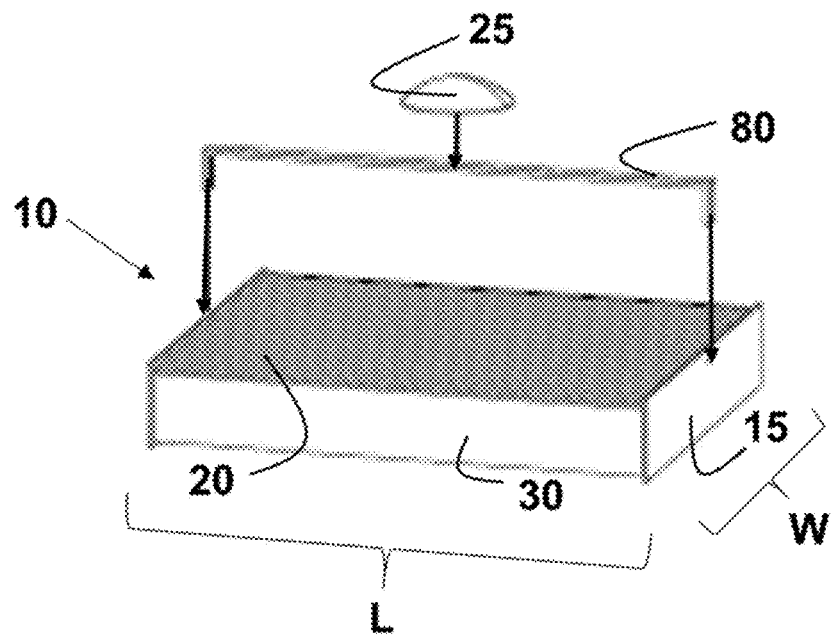
Figure 8:
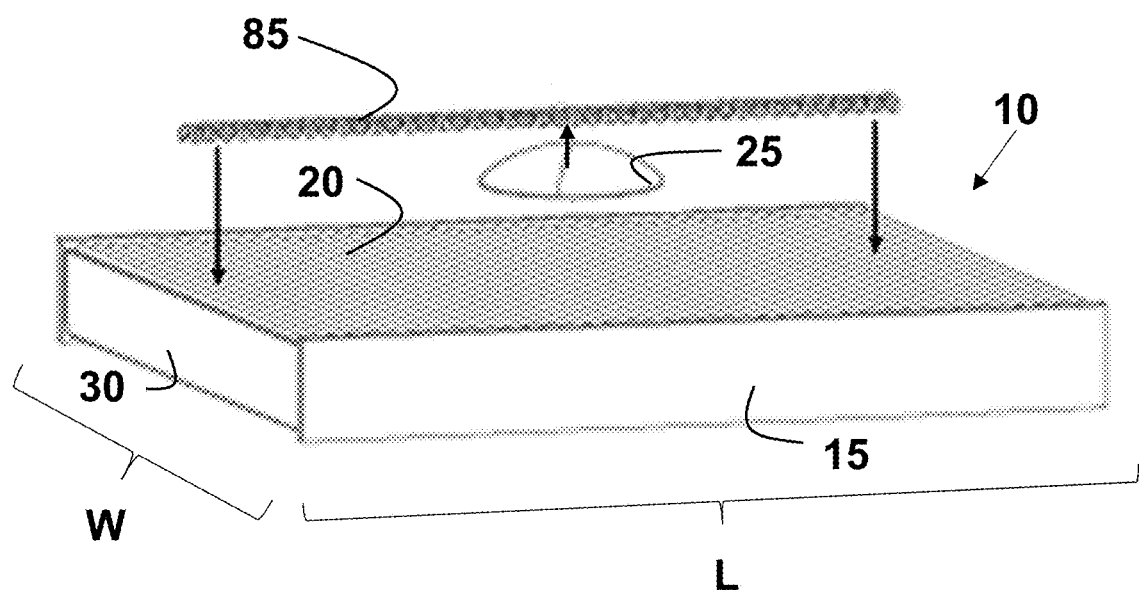
Figure 9:
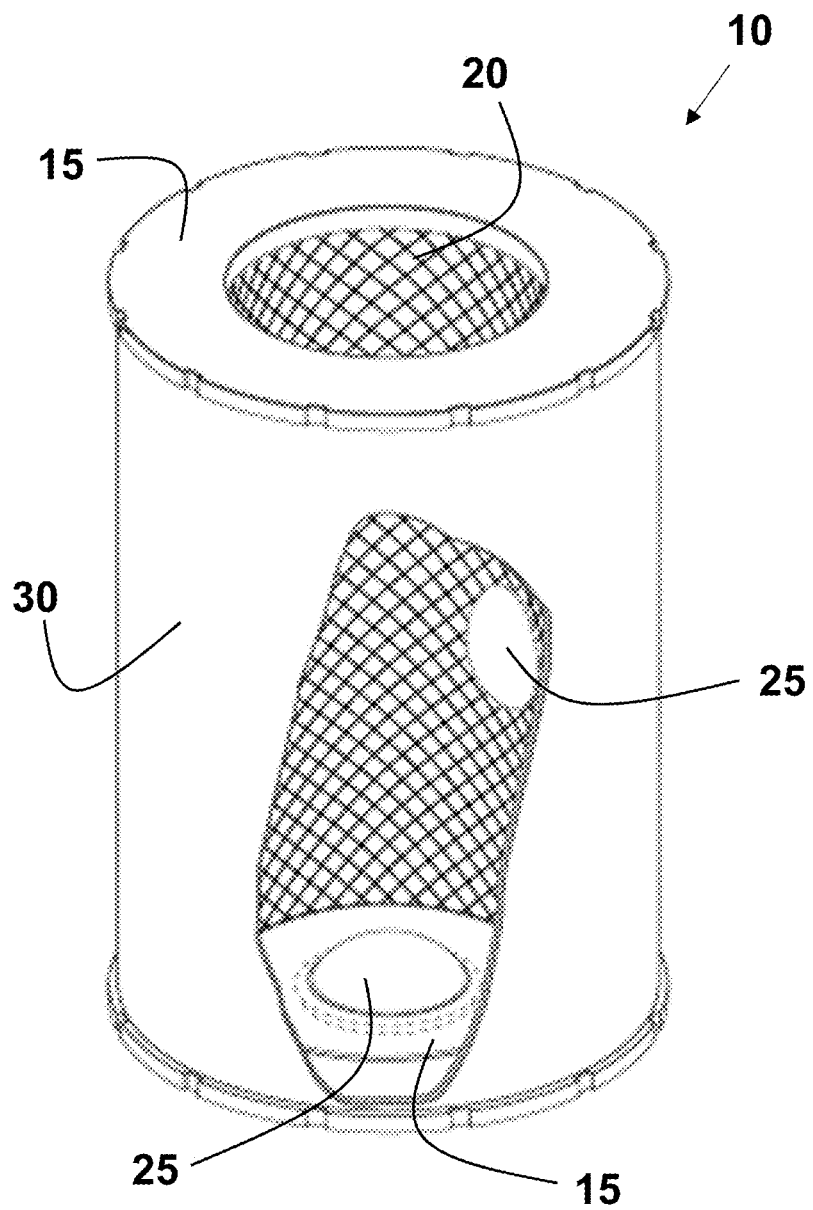
Figure 10:
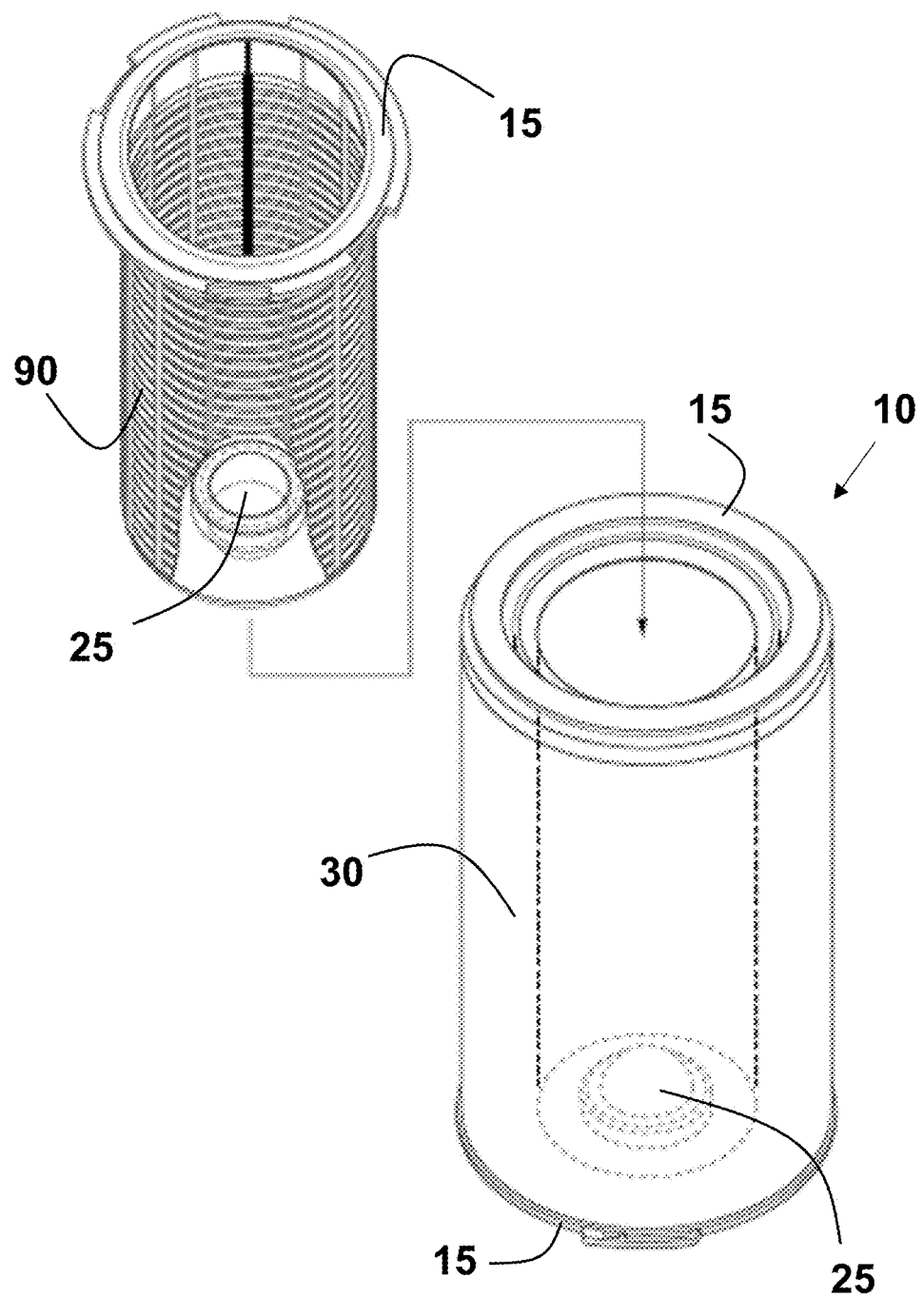
Figure 11:
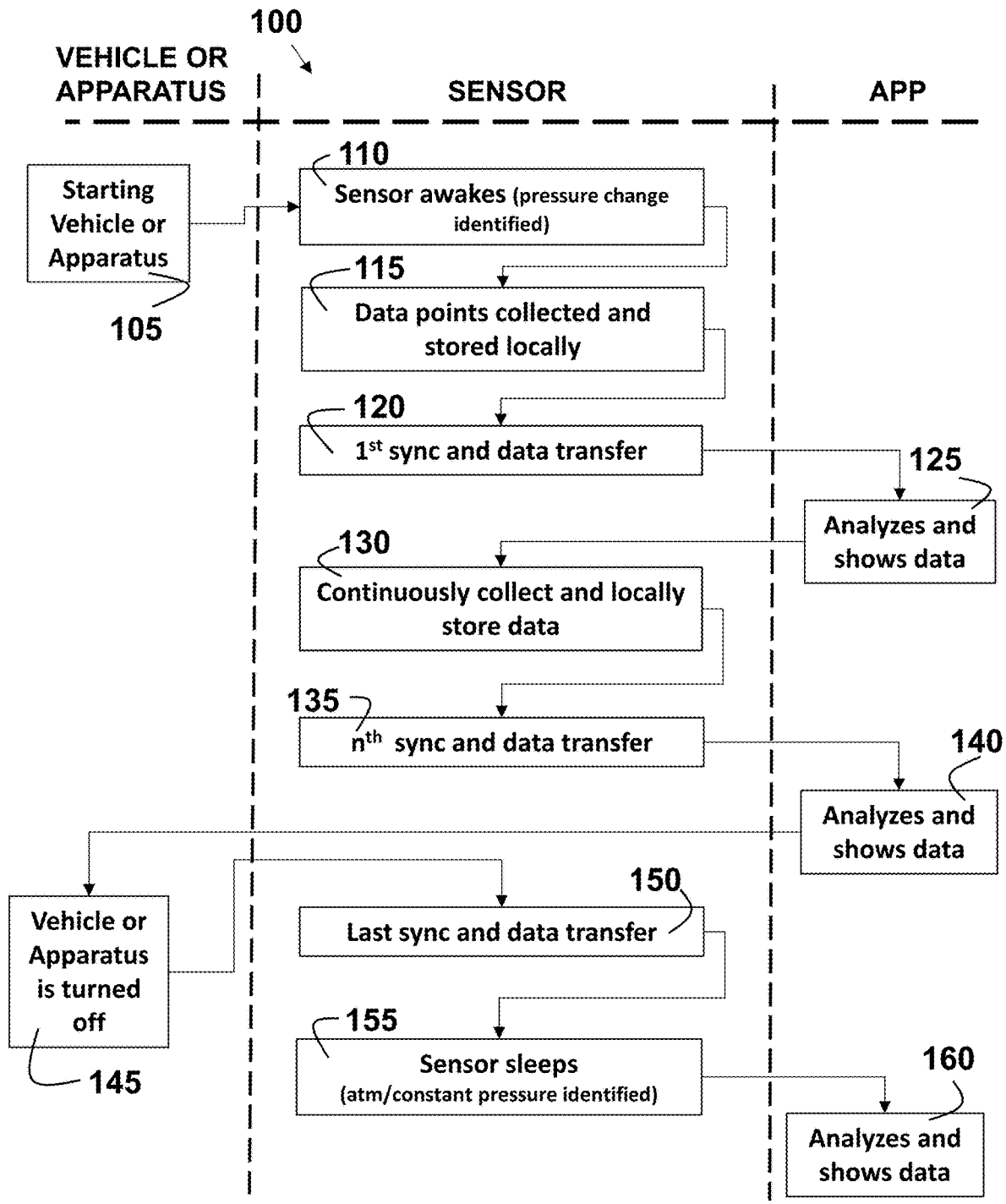

FIG. 7A provides an exploded view demonstrating the use of a sensor and a filter tab attached to the frame of the smart filter element that spans a portion of the length or width of the filter media;

FIG. 7B is another exploded view of a smart filter element demonstrating a filter strap that spans the entire length or width of the filter media used to attach the sensor;

FIG. 8 is an exploded view of a smart filter element in which the sensor is attached via a glue bead;

FIG. 9 is a perspective view of a smart filter element having a round or cylindrical shape with a cut-away showing several possible locations for the placement of a sensor;

FIG. 10 is another perspective view of a smart filter element having a round or cylindrical shape demonstrating the attachment of the sensor to the frame;

FIG. 11 is a graphical representation of the proposed logic of a method associated with using a smart filter element having a sensor according to the teachings of the present disclosure.

The drawings described herein are for illustration purposes only and are not intended to limit the scope of the present disclosure in any way. It should be understood that throughout the description, corresponding reference numerals indicate like or corresponding parts and features.

DETAILED DESCRIPTION

Various embodiments described herein are focused towards identifying when an air filter should be replaced. These embodiments utilize a sensor or sensors and analytical analysis to determine if and when the replacement of the air filter is necessary or desirable. The following description is merely exemplary in nature and is not intended to limit the present disclosure, application, or uses. For example, the smart filter elements made and used according to the teachings contained herein are described throughout the present disclosure in conjunction with a cabin filter or an engine filter incorporated into an automobile in order to more fully illustrate the construction and the use thereof. The incorporation and use of such smart filter elements in other machinery, industrial equipment and consumer devices, including without limitation appliances, furnaces, aircrafts, and boats, or the like, are contemplated not to exceed the scope of the present disclosure.

Similarly, the incorporation of the concepts described herein to other types of sensors and filters are contemplated to be within the scope of the present disclosure. Several examples of the types of sensors that would benefit from the present disclosure include without limitation, differential pressure, strain gage, airflow etc. (to directly or indirectly calculate filter element lifetime), air quality sensors (VOC sensor, harmful gases sensor, $CO/CO_2$ sensor, etc.), dust concentration sensor, particle counting, size and composition sensor, gases and chemical components sensors (e.g., ammonia, sulfur content, other odor components, etc.), air humidity and water content sensor, and allergen sensors. Several examples of other filters that may benefit from the present disclosure include, but are not limited to, fuel filters, engine and transmission oil filters, brake fluid filter, fuel cell catalyst filters, and battery, electronics and fuel cell stack venting filters.

Figure 1:
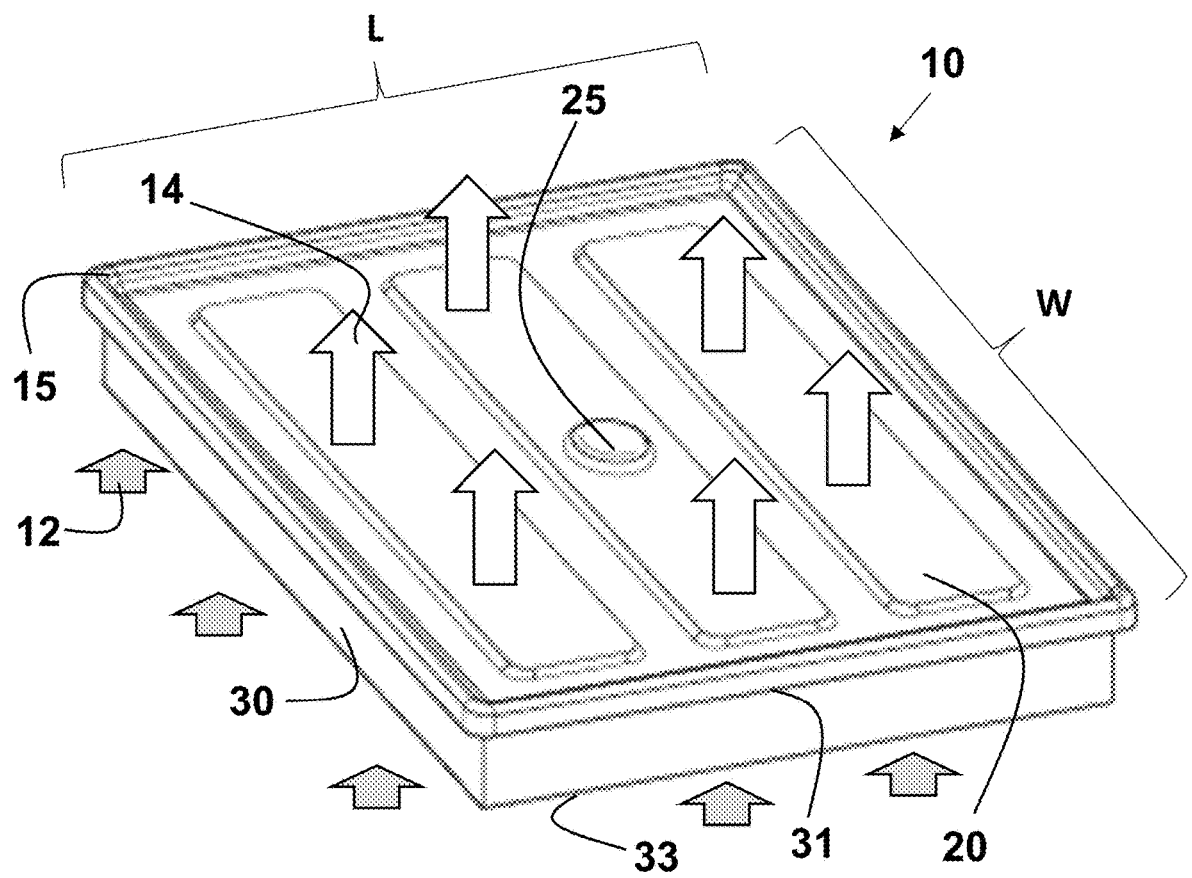
FIG. 1 is a perspective view of a smart filter element including a sensor mounted to the second side (i.e., top side) of the screen thereof.

According to another aspect of the present disclosure, the data collected by the smart filter element sensor can be applied to a variety of secondary uses. These secondary uses may include, without limitation, the application of the data to Pressure-Temperature-Humidity for meteorology use, Pressure-Temperature-Humidity-Gas Concentration for optimizing engine behavior (e.g. air/fuel ratio), Pressure-Temperature-Humidity-Gas Concentration for optimizing detection of engine failure or preventive maintenance alerts, Gas-VOC-Particle Counting-Allergen data for air quality estimation use, filter pressure change and/or particle counting data to estimate dust concentration in different work environments, and filter pressure change and/or particle counting data to estimate fuel quality in different areas As shown in FIG. 1, the present disclosure generally provides a smart filter element 10 that comprises, consists essentially of, or consists of a filter media 30, a screen 20 overlying the filter media 30, a frame 15 including a plurality of walls that surrounds at least a portion of the screen 20, and a sensor 25 located approximate to the filter media 30 and configured to measure a filter variable, such as gauge pressure, airflow characteristics, electromagnetic frequency (EMF), conductivity, or a combination thereof. The filter media 30 has a first side 33, commonly referred to as the raw, unfiltered or dirty side of the filter media 30. The filter media 30 further includes a second side 31, commonly referred to as the clean or filtered side of the filter media 30. The sensor 25 is located approximate to the second side 31. In addition, the filter element 10 is characterized by a length (L) and a width (W) that defines an external border thereof, however, the filter element 10 may be various geometry depending on the constraints within the environment, and common to conform to the shape of a housing. The sensor 25, may be optimized and positioned on the filter element 10 to measure various parameters other than pressure, the filter variables may be measured by the sensor 25, or optionally sensors (not shown) for use in determining a variety of states of the overall filter element, the fluid flow through the filter element, and filter variables to monitor the condition of the filter media to calculate and in order to identify the replacement time at which replacement of the filter should occur. The smart filter system may utilize additional parameters within the analytics, and such parameters may include without limitation, the load on the fan motor, airspeed, degree of turbulence, number and type of particulates in the airstream, optical properties, magnitude and frequency of incoming vibrations, and the occurrence of strain indicative of bending, or the like. When desirable, data measured by one or more sensors may be combined by the software used to conduct the analytical analysis in order to generate an accurate indication as to the performance of the filter element 10, and determine an accurate determination of the remaining filter life.

Figure 2:
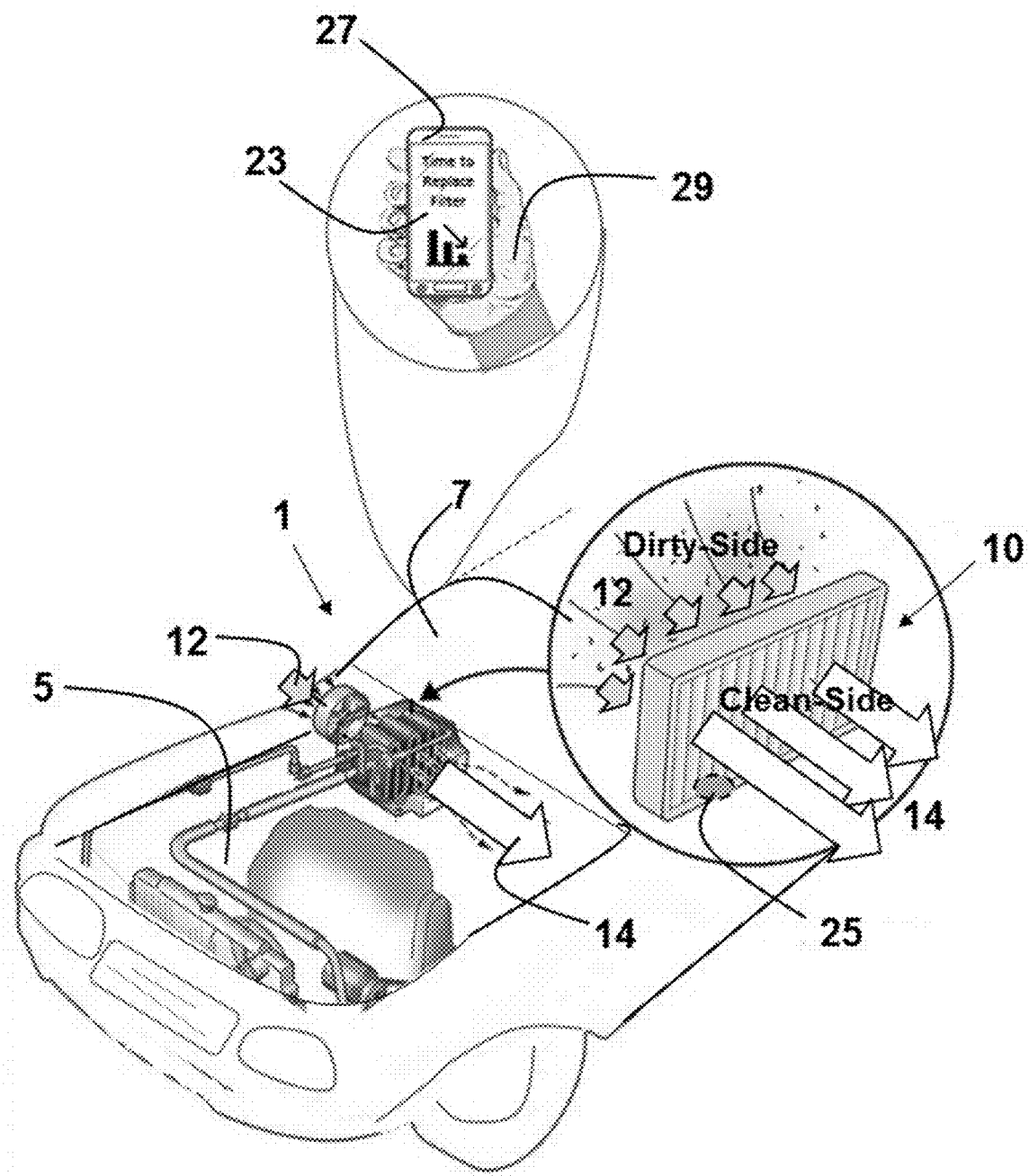
FIG. 2 is schematic representation of a vehicle that incorporates a smart filter element having a sensor according to the teachings of the present disclosure.

Referring now to FIG. 2, an example of a smart filter element 10 constructed with a sensor 25 in accordance with the principles of the present disclosure is shown in use as a cabin filter in a vehicle 1. In this application, air 12 (e.g., dirty side) is drawn in from the engine compartment 5 of the vehicle 1 flows through the filter element 10 and exits with particulates removed as purified air 14 (e.g., clean side) into the passenger compartment 7 of the vehicle 1. The sensor 25 is capable of communicating wirelessly with a receiving device 27, such as a computer or smart phone. The computer maybe within the vehicle 1, or a smart phone of the owner, for example. A software application (e.g., an APP) associated with the receiving device 27 is configured to perform analysis and calculations in order to estimate the condition of the smart filter element 10 and/or predict the effects of the filter's condition on the vehicle's 1 performance. The results of this analysis are provided to the driver and/or a third person 29 involved by any means, including but not limited to displaying the results on a screen or display 23 associated with receiving device 27 or separate therefrom. These results are provided to the driver and/or another third party in order to communicate the condition (i.e., the effectiveness or efficiency) of the air filter, as well as predict and recommend the replacement time at which the filter element should be replaced.

The benefits associated with using the smart filter 10 of the present disclosure include optimized use of filter element for final customer (filter element changed exactly when needed). The design of the sensor is applicable to virtually any shape or form of a filter element, including without limitation engine and cabin air filter elements. In positioning the sensor 25 it may be fixed to the filter media 30, but may also be secured within the flow path from the clean side and not directly fixed to the filter media 30. In some applications, this is advantageous since the sensor 25 may avoid possible damage that could result in the movement of the filter media 30 resulting in pressure or additional weight against the sensor 25 when exposed to natural vibrations during operation of the vehicle 1 or machinery. Additional advantages associated with the smart filter element 10 of the present disclosure over conventional filter assemblies include a savings in energy consumption, the ability to securely transfer data, and simplicity associated with the data management from the sensor 25 via a wireless transmission, reducing wiring harness or wire complexity connections from the vehicle directly to the sensor 25. Data generated by other vehicle systems and other connected devices may further enhance the functionality of the smart filter element 10.

Figure 3A:
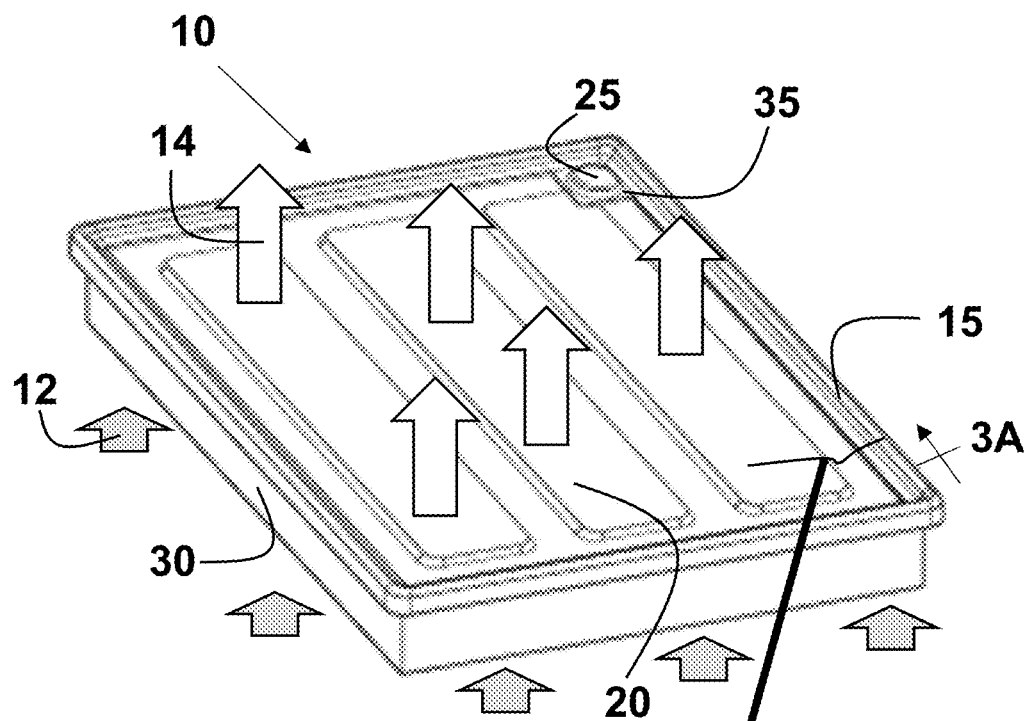
FIG. 3A is a perspective view of a smart filter element wherein the sensor is mounted to the surface of a tab located as part of the frame thereof according to another aspect of the present disclosure.

According to one aspect of the present disclosure, the smart filter element 10 may incorporate the sensor 25 on the second side 31 of the filter media 30 or on one of the outer surfaces, either the second face 23 or the first face 21, of the screen 20, as shown in FIG. 1. Referring now to FIG. 3A, according to another aspect of the present disclosure, the smart filter element 10 may incorporate the sensor 25 attached or secure on the top surface of a tab 35. This tab 35 is located adjacent to the frame 15, or an external border around the filter media 30. In the illustrated example the tab 35 is generally constructed to extend away from the frame 15 structure inwardly towards the center of the screen 20. This tab 35 may be molded as part of the frame 15 for some applications such as engine or cabin air filters. The tab 35 allows the sensor 25 to be positioned within the flow path of the purified air 14 from the clean or second side 31 of the filter media, which may allow the sensor 25 to reliably measure the filter variables associated with the flow characteristics or pressure of the purified air 14 through the filter media 30.

Figure 3B:
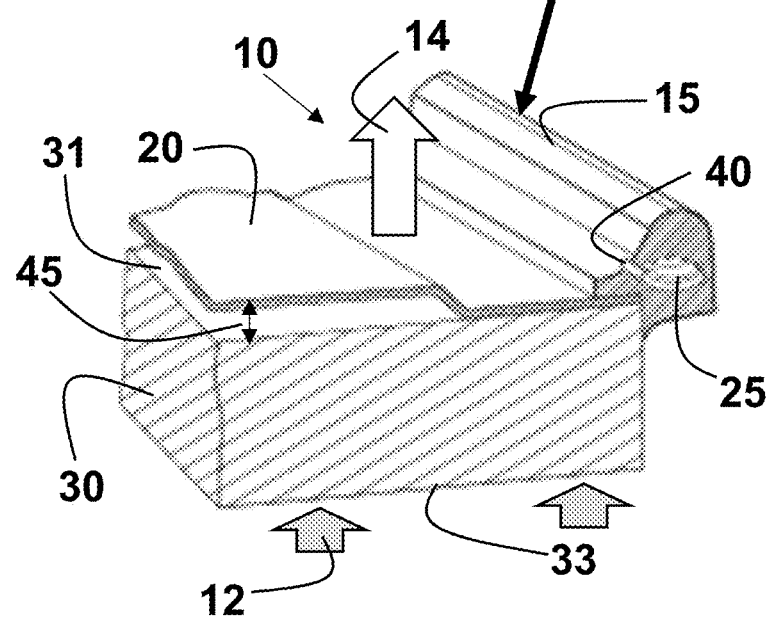
FIG. 3B is a cross-sectional view of a smart filter element of FIG. 3A sectioned at plane 3A illustrating the encapsulation of the sensor within the frame thereof.

In FIG. 3B, another example of a smart filter element 10 is shown in which the sensor 25 is at least partially encapsulated within the frame 15. The sensor 25 may further be encapsulated during the frame forming process, or secured within the frame 15 after the frame forming process. Such encapsulation of the sensor 25 may be incorporated within the original profile of the frame 15 or may also incorporate or even be encapsulated within the tab 35 or secured to an additional tab structure (not shown). A communication channel 40 in the frame 15 may be established between the sensor 25 and the second side 31 (e.g., clean side) of the filter element 10.

Figure 4:
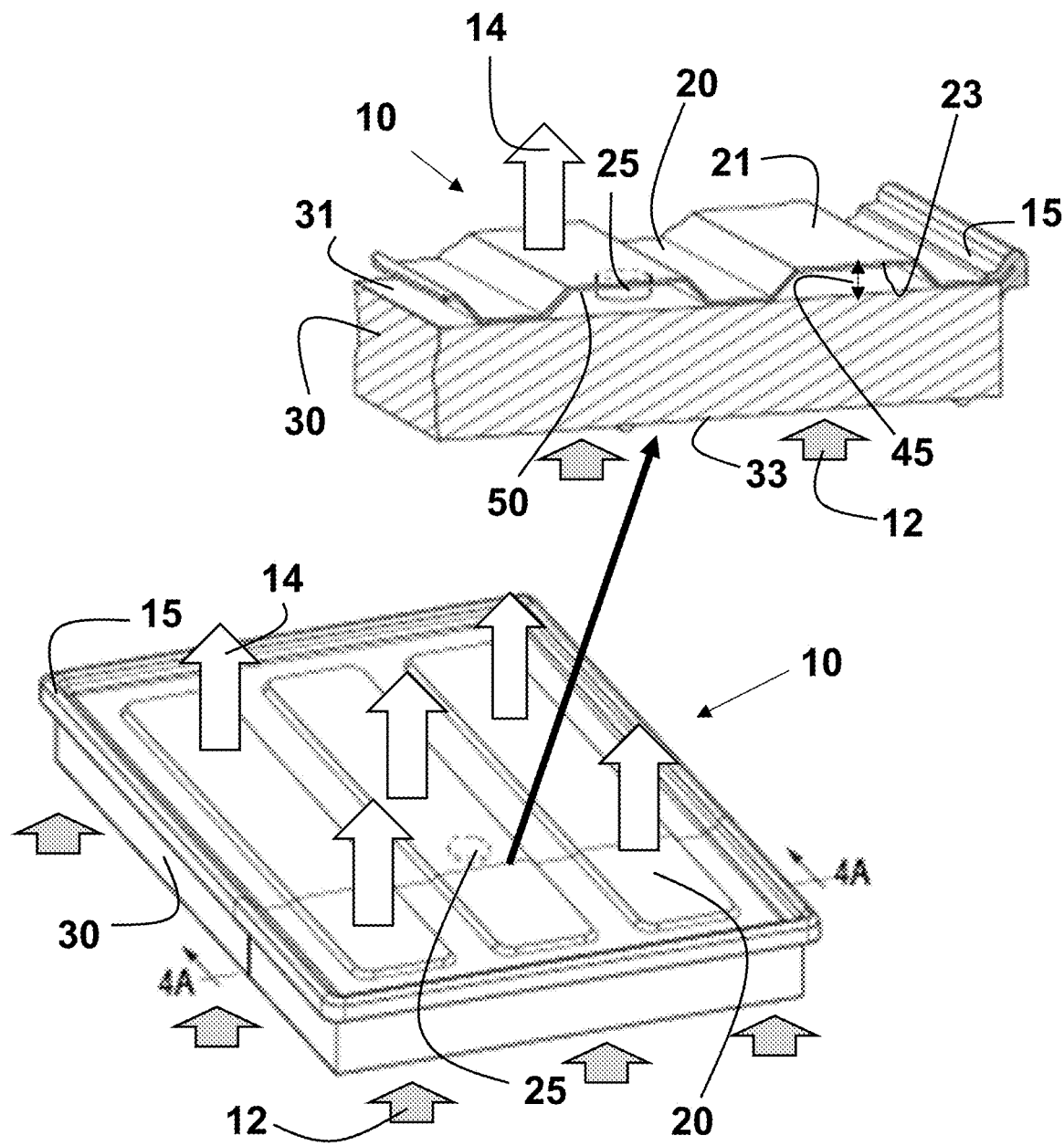
FIG. 4 is a perspective view and a cross-sectional view of a smart filter element taken at plane 4A that shows a sensor mounted to the first side (i.e., underside) of a screen thereof.

Referring now to FIG. 4 and FIG. 5, the screen 20 may include a sensor 25 that is attached to the screen 20 in a cavity 45 or gap formed between the screen 20 and the filter media 30. The screen may comprise a first face 23 located approximate to the filter media 30 and a second face 21 opposite the first face 23 located away from the filter media 30; wherein the sensor 25 may be directly attached to the screen 20 on either face 21, 23. According to one aspect of the present disclosure, the sensor 25 may be attached to the first face 23 (e.g., under-side) of the screen 20 in a portion of the screen 20 wherein the screen embossing height has been increased due to the presence of a pleat or fold or shape in the screen 20. The screen 20 may comprise one or more pleats or folds or formed in a shape, as desired, to accommodate the sensor 25, and the screen 20 may also include an attachment feature on either face 21, 23. FIG. 4, the sensor 25 is located in a cavity 45 or gap formed between the first face 23 of the screen 20 and the second side 31 of the filter media 30 (see FIG. 4). According to another aspect, the media 30 may be embossed as shown in FIG. 5. The cavity 45 or gap between the sensor 25 attached to the first face 23 (e.g., underside) of the screen 20 and the second side 31 of the filter media 30, the embossed filter media 30 may be increased by being located where a recess 55 occurs in the filter media in conjunction with a pleat, or raised ridge or additional attachment feature in the screen 20 (see FIG. 5).

Thus, such recess 55 as shown is increased due to the embossed or fold height of the filter media 30 can vary, to change the recess 55 location, and in combination with the fold or pleat or raised ridge in the screen 20 may be used to define the cavity 45, and allow for the cavity 45 to vary in height to accommodate various sensors 25.

Figure 6A:
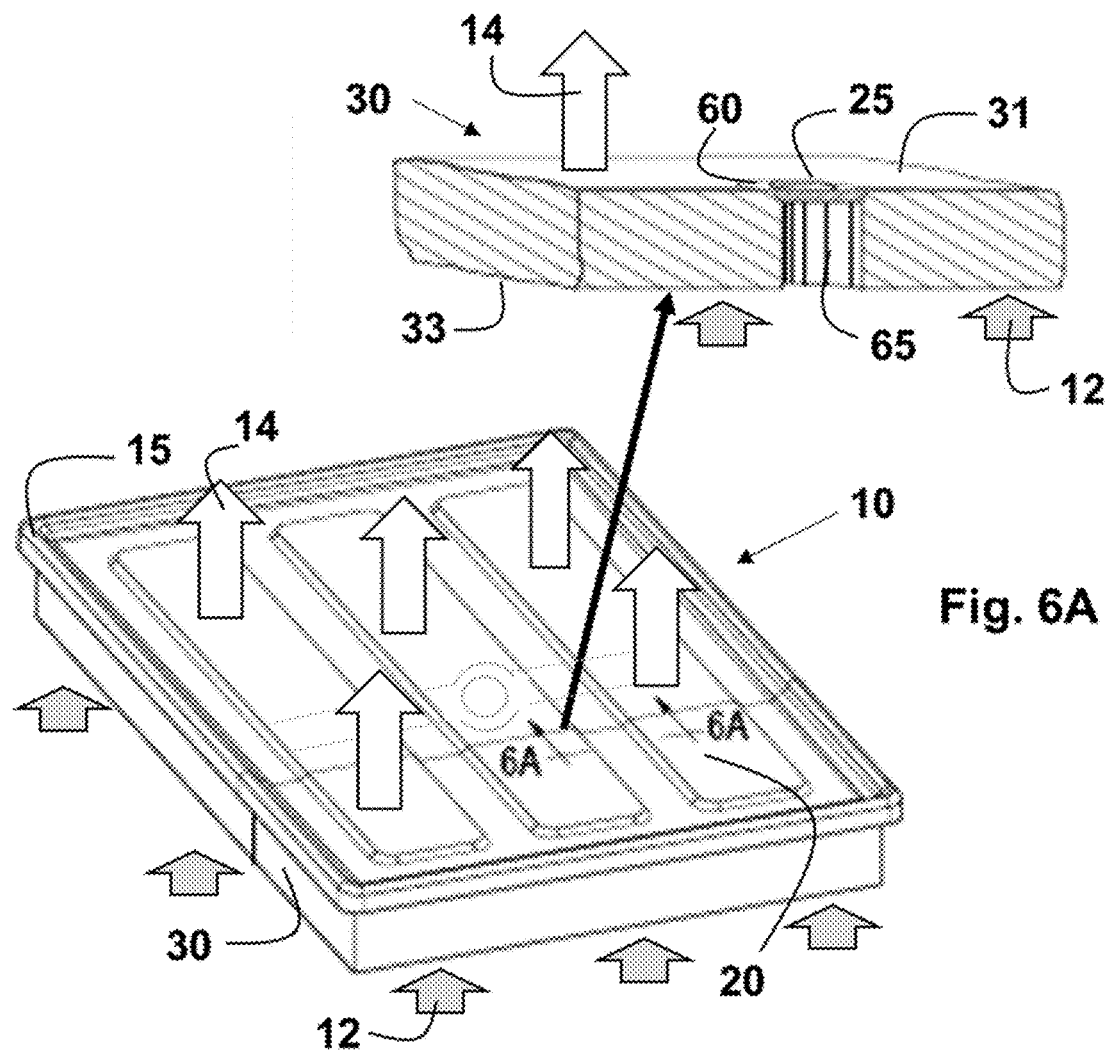
FIG. 6A is a perspective view and a cross-sectional view of a smart filter element taken at plane 6A illustrating the construction of an island on the second side (e.g., clean side) of the filter media, such that the sensor is located on or within the island.
Figure 6B:
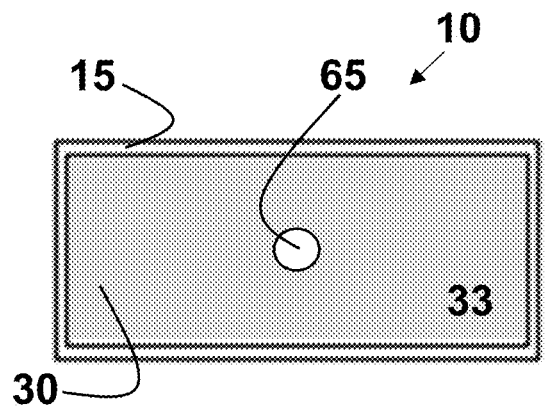
FIG. 6B is a bottom-up view of the through-hole formed in the filter media leading from the first side (e.g., dirty side) of the filter media to the island and sensor.

Referring now to FIG. 6A, a smart filter element 10 is shown in which the sensor 25 is placed onto the surface of an island 60 formed on/in the top portion or second side 31 (e.g., clean side) of the filter media 30. The island 60 may be secured to the screen 20, or directly secured to the filter media 30. When the sensor 25 is located in this configuration, a through-hole 65 is typically formed in the filter media 30 under the island 60 or sensor 25. This through-hole 65 connects the second side 31 (e.g., clean side) of the filter media 30 to the other side or first side 33 (e.g., dirty side) of the filter media 30. A bottom view of the through-hole 65 in the filter media 30 is shown from first side 33 (e.g., dirty side) of the filter media 30 in FIG. 6B.

Figure 6C:
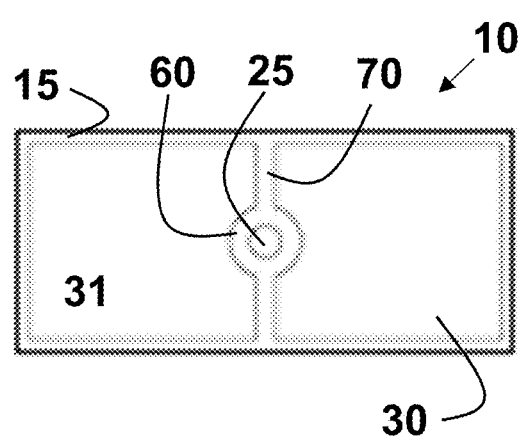
FIG. 6C is a top-down view of the sensor and island formed on the surface of the second side (e.g., clean side) of the filter media with the incorporation of an optional connector element coupling the island to the frame.

The composition of the island 60 may include any known thermoset or a thermoplastic polymeric material, as well as any type of metal or metal alloy. Alternatively, the composition of the island 60, may include but not be limited to, a polyurethane material. When desirable, one or more optional connector elements 70 may be formed between the island 60 and the frame 15 as shown in FIG. 6C from the second side 31 (e.g., clean side) of the filter media 30. The composition of the optional connector elements 70 may be the same as or different from the polymer(s) used to form the island 60. Alternatively, the optional connector 70 is formed, without limitation, from a polyurethane material, and the connector 70 may be a separate piece that allows the sensor to be directly secured above the second side 31 of the filter media 30. The island 60 may vary in shape along with the connector 70 to secure the sensor 25 in the optimal spot over the filter media 30, for measuring the desired filter variable.

Referring now to FIGS. 7A and 7B, according to another aspect of the present disclosure, a filter tab 75 may be fastened to the frame 15 of the smart filter element 10. This filter tab 75 may span a portion of the length (L) or width (W) of the filter element 10 as shown in FIG. 7A. The filter tab 75 is used to position and attach the sensor 25 to the filter element 10. This filter tab 75 may be attached to the frame 15 using an adhesive 77 or another form of a fastener, including without limitation a screw, bolt, or clip (not shown). The filter tab 75 may be encapsulated into the frame 15 during the forming or molding process (not shown).

When desirable, the filter tab used to position and attach the sensor 25 may be in the form of a filter strap 80 that spans the entire width (W) or length (L) of the smart filter element 10 as shown in FIG. 7B. This filter strap 80 may be attached to the frame 15 in the same manner as previously described for the filter tab 75. The filter tab 75 or filter strap 80 may compositionally comprise any material normally used for the filter frame's 15 side/end strips or is compatible therewith.

Referring now to FIG. 8, the sensor 25 may be attached to a glue bead 85. In the illustrated example, the sensor 25 is placed on the filter media 30, and attached or secured in place on the underside of the glue bead 85. The glue bead 85 may exist either for enhancing the filter structure and/or specifically for attachment of the sensor 25. In this case, the sensor 25 is not attached directly to the filter media 30, but rather allows the positioning to move along the length (L) or width (W) of the filter media 30 within the physical constraints provided by the glue bead 85, and may optimize the location for measuring the desired filter variable. On foursided assemblies for the filter element 10, the first end and second end of the glue bead 85 may be attached to the end strips of the frame 15 or to a portion of the side strips. Optionally, the glue bead 85 may be on the second face 21 of the screen 20, and allow the sensor to be secured to the screen via the glue bead 85.

The shape of the smart filter element 10 may be any geometrical or polygonal shape, including without limitation, square, rectangular, conical, pentagonal, hexagonal, or cylindrical. Alternatively, the shape of the smart filter element 10 may be square or rectangular as shown in FIGS. 1-8. In FIG. 9, an example of a round or cylindrical shaped smart filter element 10 is shown in which the sensor 25 is over-molded to the bottom of the frame 15 and/or fastened to the surface of or trapped between the media 30 and screen 20. Referring now to FIG. 10, another round or cylindrical shaped filter element 10 is shown in which the sensor 25 is welded or clipped to the bottom of the frame 15 or over-molded into said frame 15. In this case, a frame insert 90 may be used in place of the screen or in combination therewith. The frame insert 90 may be inserted or placed within the filter media 30 to form the smart filter element 10.

The sensor 25 may be a single pressure sensor, or a plurality of different sensors. The sensor(s) may be used to identify the occurrence of a pressure obstruction (e.g., plugging, etc.) in the filter media. In other words, the pressure drops while air is flowing, with such drop in pressure being greater or increasing as the filter becomes more and more obstructed or plugged. A threshold value, such as a drop in pressure of at least 2 kilopascals (kPa), alternatively, 3 kPa or more for engine filters and about 200 Pascals (Pa) or more for cabin air filters as compared to the initial flow rate measured when the filter was new (e.g., installed), may be used to identify the need to clean or replace the filter element. The sensor may include electronics to process and communicate sensor measurements that reflect the condition of the filter media.

The frame 15 provides support for the filter media 30 and defines the perimeter of the smart filter element 10. The frame may comprise one or more sidewalls (e.g., top, bottom, left, and right sidewalls) that identify the edges associated with the filter element. The frame may be made from any suitable materials, including without limitation nonwoven, paperboard, cardboard, or injection molded plastic materials. Thus, the frame may be constructed by injection molding or by folding the paperboard or cardboard to form the various sidewalls. When desirable, at least the downstream face of the filter element may comprise additional support members that extend in any desired direction at least partially across the filter media. The inclusion of such additional support members assists in ensuring consistent deformation of the filter media during operation in response to the air flow/pressure encountered, as well as prevent collapse under wet or high pressure conditions.

The filter media 30 may be pleated or unpleated as desired, and variations in the pleats, folds may allow to change the attachment feature or location of the sensor 25 on the filter element 10. The filter media 30 may also be comprised of any known material, in any conceivable configuration, that is capable of filtering particulates and/or undesirable chemicals from an airstream while the airstream is flowing or moving. Such filter media may include, but not be limited to, fibrous materials (e.g., nonwoven webs, fiberglass webs, or the like), and honeycomb structures that are loaded with filter media and/or absorbent or adsorbent materials.

When desirable, the filter media may include one or more layers that comprise at least one material that may be electrically or electrostatically charged to form an electret material. Thus, the filter media may be a multilayered media that comprises at least one layer formed of an electret material, and/or at least one layer formed of one or more absorbent or adsorbent materials. The filter media may also be comprised of at least one layer that is capable of high-efficiency particulate absorbing (HEPA) filtration. Electrostatically charged media may enhance particulate capture and filtering.

If a layer of the filter media is to exhibit absorption or adsorption functionality, the filter media may comprise any suitable absorbent or absorbent materials, in any convenient physical form. Several examples of such materials include, without limitation, activated carbon, zeolites, and activated alumina. These materials may be provided in any usable form, including for example, as particles in the form of a powder, beads, flakes, whiskers, granules, and agglomerates or combinations thereof. The sorbent particle size may vary as desired. The sorbent particles may be incorporated into or onto a layer of filter media in any desired fashion, including but not limited to being physically entangled with fibers present in the filter media, adhesively bonded to such fibers, or some combination thereof.

Referring now to FIG. 11, the general logic associated with a method 100 of using a smart filter element is provided. This method 100 is divided into tasks or operations performed with the vehicle (e.g., car, etc.) or device that includes the smart filter element, the sensor that is part of the filter element, and a software application (i.e., APP) configured to provide data and results to the vehicle's driver or a designated third party. The operations associated with the vehicle or other apparatus or device including starting the vehicle/apparatus 105 and turning off the vehicle/apparatus 145. Each time the vehicle/apparatus is started 105, the sensor is awakened 110 and the pressure drop is measured. This action may be performed relatively quickly, such as less than about one second after the car is started. Data points are then collected and stored locally 115. The data acquisition rate may be any desired rate, including for example, one data point per second; at least two data points per second; alternatively, at least three data points per second; alternatively, five data points or more per second. The first time the vehicle/apparatus is started after a new smart filter element is incorporated therein, the sensor will perform a baseline or diagnosis run. The pressure drop measured at idle in this diagnosis run is saved as a baseline indicating the initial condition of the filter element.

The sensor is then synchronized with the receiving device and data is transferred 120 from the sensor to the receiving device. This synchronization may occur within about ten seconds after the sensor is awaken; alternatively, between about five seconds and fifteen seconds. For example, in one configuration in a one-minute time frame, the sensor 25 will synchronize with the receiving device 27 and transfer data greater than three times; alternatively, about six times; alternatively, up to ten times. The synchronize pattern, and timing may vary for the desired real-time or measurement accuracy, but also changed to allow best conserve power within the sensor 25, to allow the sensor 25 to last the useful life of the filter media 30. The APP associated with the receiving device analyzes the data and then displays or shows the results 125 to the end user (e.g., the driver or designated third party) on a monitor or display.

The sensor 25 continuously collects and locally stores data points 130. This data collection may be accomplished at an acquisition rate of at least one point per second; alternatively, at two points or more per second with a minimum of 2,000 points being capable of being stored in memory at any given time. The sensor continuously and regularly synchronizes and transfers data 135 to the receiving device every ten minutes; alternatively, every 30 minutes with greater than three, alternatively, about six, alternatively, up to ten synchronization and data transfer tries occurring in a period of one minute. The end user (i.e., driver or designated third party) may also request at any time an update, which will immediately force synchronization and data transfer to occur. Upon each synchronization and data transfer, the receiving device analyzes the data and shows the results 140 on a display to the end user. The synchronization and data transfer may occur an $n^{th}$ number of times up until the time the vehicle/apparatus is turned off 145.

Once the vehicle/apparatus is turned off 145, a final or last synchronization and data transfer occurs 150 to the receiving device within one minute of the vehicle/apparatus being turned off. The sensor measures a final pressure and goes into an inactive or sleep mode 155 until the vehicle/apparatus is restarted 105. The sensor performs this final measurement within two minutes after the vehicle/apparatus is turned off; alternatively, between one minute and two minutes after the vehicle/apparatus is turned off. The receiving device 27 analyzes the final data transferred and shows 160 the results to the end user on a monitor or display. Optionally, if the vehicle is off for a long duration, the sensor may awake 110 without the user having to start the vehicle to periodically to take measurements.

The analysis performed by the receiving device includes comparing the data collected at any given time against the data initially obtained in the diagnosis run in order to determine the condition of the filter element (e.g., the filter element lifetime). The filter element lifetime may be calculated by adding together the initial baseline pressure measured in the diagnosis run and the last validated pressure data measured during operation (e.g., when the vehicle/apparatus is turned-on, perhaps at idle, etc.), then subtracting the latest or most recent pressure measured when the vehicle/apparatus is turned off.

Data is considered to be valid when it is recognized by the receiving device to have been collected under one or more of the following six conditions: (1) the vehicle is at idle, (2) the vehicle is at full throttle, (3) the vehicle is at steady speed, (4) the vehicle is operated at a throttle that is lower than a predetermined percentage; (5) the vehicle is operated at a specific predetermined engine rotational speed, or (6) the vehicle is operated at a specific predetermined gear selection (including Park or Neutral). The receiving device 27 may validate the collected data by comparing it with "expected values" based on one or more of the following criteria: a) the data collected on the initial diagnosis run, b) the last data collected and validated, c) APP embedded or cloud based database, d) the use of formulas/equations or machine learning logic, and e) data collected in specific times of the day or occasions (e.g. under specific situations associated the driver's routine or locations). The atmospheric pressure may be calculated based on one or more of the following criteria: i.—latest data collected by the pressure sensor while vehicle is turned off; ii.—the first data collected after receiving device-sensor pairing (e.g., Bluetooth) before vehicle/apparatus is started; iii.—information collected from the vehicle/apparatus or any other sensor in it; and iv.—any other information collected from or through the receiving device.

The application software (APP) may interact with the end user (e.g., driver or designated third party) by displaying a variety of information in addition to the pressure data. This additional information may be relative to the filter element, the vehicle/apparatus, or the end-user. Several examples of such information include, without limitation, the filter element part number, filter element life time and condition, pressure data, vehicle performance indicator, filter element purchasing recommendation; temperature data, battery power data, vehicle characterization (e.g., model, year, usage, etc.), company data (size, market, home location); engine related data (e.g., rotation, fuel/air ratio, emissions level, etc.), data from other sensors (e.g., PCU temperature, airflow speed, intake air temperature, etc.), general vehicle data (e.g., speed, acceleration, selected gear, duration of travel, global positioning system (GPS), compass, altitude, inclination, etc.), general environmental data (e.g., time, date, weather condition, internal/external temperature, dust/pollutant contamination level, etc.), camera generated data; and wireless connectivity status. The functions associated with the APP may include but not be limited to sensor pairing and user characterization, calculations and usage of data from filter element and other sources, user interface (graphical representation), fleet management device, and variations to general system and logic.

Sensor Pairing and User Characterization—Whenever a new filter element is recognized, the APP may recognize the electronic identification (ID) from the filter element sensor, such as an RFID, NFC or other digital, wirelessly transmitted code. If there is already one filter element currently being tracked by the APP, whenever a new filter element is recognized, the APP will inquire whether the end user wishes to pair to new filter element. The end user may select a preferred filter element to be shown on the main or start page, but all paired filter elements should be selectable from a list.

Upon the first launch of the APP, general questions are asked in order to characterize the end user. Such questions may include, for example, the vehicle model and year, primary vehicle usage, if vehicle air intake system has been modified from original factory condition, general personal data (age, sex, home city etc.). The APP may also suggest answers based on information read from the sensor. For example, such suggested answers may include selecting the vehicle model and year from a shortlist based on the filter element part number, suggesting that air intake system is not original based on the pressure data not being aligned with expectations for such a part number and environment. The APP may also ask for specific use of other personal data electronically available, such as home and work addresses, live location, weather forecast, credit card information, internet cookies etc. The APP may create a user routine with information related to commuting time, duration, traffic level, route information, and average speeds.

Calculations and Usage of Data from Filter Element and other Sources—When a sensor is recognized as awake for the first time, the APP will request the end user to wait so that the APP may run a diagnosis step to identify the initial filter element conditions at idle or under another specific or predetermined driving condition selected by the end user. The APP will collect raw data from the pressure sensor to be used for the calculation of the predicted filter element lifetime. When desirable, the APP will collect data from other sensors potentially available in vehicle, linked or not to another component to be used for the calculation of the filter element lifetime. This additional data may include, but not be limited to engine rotation speed, fuel efficiency, air/fuel rate, emissions level, power cell components temperature, any other vehicle parts or fluids condition, airflow temperature, airflow speed, vehicle speed, selected transmission gear, rain, humidity, ambient temperature, weather condition, wind speed and direction, internal temperature, vehicle location and acceleration, GPS, compass, orientation, vehicle altitude, vehicle inclination, battery capacity, voltage or current, connectivity to wireless network (e.g., 3G/4G), light, time of the day and day of the week, month or year, duration of event, key or wireless key or equivalent presence and contact, vehicle general condition (e.g., on, off, remote-start activation etc.).

The APP may also collect other types of data available to the receiving device that may be used for calculations of filter element lifetime. Several examples of such other types of data that may be collected include, without limitation, location, acceleration, altitude, movement, camera generated data, temperature, humidity, weather condition, wind speed and direction, light, battery capacity, voltage or current, wireless connectivity, connection to physical ports, proximity, compass, orientation, time of the day and day of the week, month or year, duration of event, device general condition (e.g., on, off, etc.).

The APP may use any of the above mentioned data and/or user personal data to: calculate changes in vehicle/apparatus performance indicators, such as engine power performance and fuel efficiency performance due to filter element clogging; calculate the filter element's efficiency and/or current and remaining capacity in weight, time or mileage; determine the existence of bypass, collapse, or other failure modes of filter element; identify the current vehicle's condition (on/off, remote started, idle or geared, driving condition, e.g., city, traffic, or highway, sport/economy mode, and special driving situations, such as overcoming slopes or other barriers, etc.). The APP may also determine when the filter needs to be cleaned by means of a service or a self-cleaning device. The APP may also determine when to collect and/or mark as valid any of the above mentioned data.

User Interface (Graphical Representation)—The display or user interface associated with the APP will show a graphical representation indicative of filter element lifetime. The APP may also display an indicator relative to vehicle efficiency (e.g., engine power performance, fuel efficiency performance etc.) in addition to or instead of filter lifetime. When desirable, the user interface may show more than one indicator of vehicle efficiency with the preferred indicator being selected based on the end user's automatic or manual input. For example, if the APP recognizes that a vehicle is used primarily for commuting, the display may show fuel efficiency performance. At any time the end user may request a current update and force the synchronization of the sensor and receiving device, thereby allowing the sensor to collect data at the time of the request and/or transfer all data collected and stored locally after the last synchronization event.

Fleet Management Device—The APP may also include a means to control or provide for fleet management. More specifically, the receiving device is a wireless communicator, which can be or not be connected to the fleet vehicle's internal communication network (CAN/LIN buses) and can be or not be connected to a central controlling device or database (i.e. fleet management operations center). Everything that is described as a function of the receiving device and/or the APP would become part of the central controlling device and/or other databases connected thereto. The receiving device may collect, store and manage all data described herein, including other potential sensors installed in different vehicle components. The device may also act as a collector and transmitter of information generated in the vehicle to a central database or device located elsewhere and managed by a second person or user. The receiving device also may or may not connect and communicate to/with the driver in order to collect other data such as location, weather condition, date and time, personal data for characterization of work routine etc.

Variations to General System and Logic—The measured data may be collected, analyzed, and managed either locally via the mobile phone or portable device controlled by the driver; uploaded to a cloud based platform; or sent to a processing unit located within the vehicle. Instead of having the data analyzed and managed in/on a mobile phone or portable device, the receiving device may work as a bridge to transfer data from the sensor to a cloud based platform, where data is collected, stored, managed and analyzed. The data may be directly transmitted from the sensor to a cloud based platform. When desirable, such transmission may be conducted via wireless communication (ex.: 3G, 4G, 5G). Filter element lifetime and/or car performance is then transferred back to the mobile phone device or portable device or a third device to be shown to the final end user (e.g., driver or designated third party). Similarly, data may collected, stored, managed and analyzed at a processing unit located adjacent to the pressure sensor (in the same or in a second printed circuit board). Filter element lifetime and/or vehicle performance is then transferred wirelessly to the mobile phone device or portable device or a third device to be shown to the final end user (e.g., driver or designated third party).

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:
1. A smart filter element comprising:
 a filter media having a first side and a second side; wherein the first side includes a length and a width that defines an external border for the filter media
 a frame comprising a plurality of walls, the frame surrounding at least a portion of the filter media; and
 a sensor configured to measure a filter variable and to communicate wirelessly with a receiving device, the sensor being secured to the frame approximate to the second side of the filter media;

wherein a screen is secured within the frame, the screen comprises a first face located proximate to the filter media, and a second face opposite the first face located away from the filter media;

wherein the sensor is directly attached to at least one of the first face or the second face of the screen;

wherein the screen comprises one or more ridge projecting away from the second side of the filter media, and the ridge defining a cavity between the first face of the screen and the second side of filter media, wherein the sensor is located within the cavity.

2. The smart filter element according to claim 1, wherein the frame includes a tab having a surface upon which the sensor is attached; wherein the tab is located adjacent to the external border of the filter media.

3. The smart filter element according to claim 1, wherein the sensor is embedded within the frame, the frame further comprising a communication channel established between the sensor and the second side of the filter media.

4. The smart filter element according claim 1, wherein the sensor is attached between the screen to the second side of the filter media.

5. The smart filter element according to claim 1, wherein the second side of the filter media comprises one or more recesses, the location of at least one of the recesses corresponding to the location of at least one of the one or more ridges in the screen, such that the recess further defines the cavity in which the sensor is located.

6. The smart filter element according to claim 1, wherein the second side of the filter media comprises an island having a surface upon which the sensor is attached;

wherein the filter media includes a through-hole located under the island or sensor that connects the first side of the filter media to the second side of the filter media.

7. The smart filter element according claim 6, wherein the island is connected to the frame via one or more connector elements.

8. The smart filter element according claim 6, wherein the island is formed of a polyurethane material.

9. The smart filter element according claim 1, wherein the smart filter element further comprises either a filter tab that spans at least a portion of the length or width of the filter media with one end of the filter tab being attached to the frame or a filter strap that spans the entire length or width of the filter media with both ends of the filter strap being attached to the frame;

wherein the sensor is secured to the filter tab or to the filter strap.

10. The smart filter element according claim 1, wherein the smart filter element further comprises a glue bead having a first end, a second end, and an underside, such that the first end and second end are attached to at least one of the screen and the frame with the sensor being attached to the underside.

11. The smart filter element according to claim 1, wherein the smart filter element has a shape that is square, rectangular, conical, pentagonal, hexagonal, or cylindrical.

12. The smart filter element according claim 10, wherein the shape of the filter element is cylindrical.

13. A system for monitoring the condition of a filter incorporated into a vehicle or other apparatus in order to identify when the filter should be cleaned or replaced; the system comprising:

a receiving device; and a smart filter element comprising
a filter media having a first side and a second side; wherein the first side includes a length and a width that defines an external border for the filter media a frame comprising a plurality of walls, the frame surrounding at least a portion of the screen; and a sensor configured to gauge pressure and to communicate wirelessly with the receiving device, the sensor being located approximate to the second side of the filter media;

wherein a screen is secured within the frame, the screen comprises a first face located proximate to the filter media, and a second face opposite the first face located away from the filter media;

wherein the sensor is directly attached to at least one of the first face or the second face of the screen;

wherein the screen comprises one or more ridge projecting away from the second side of the filter media, and the ridge defining a cavity between the first face of the screen and the second side of filter media, wherein the sensor is located within the cavity.

14. The system according claim 13, wherein the sensor performs an initial baseline pressure measurement after the smart filter element is first installed in the vehicle or apparatus and then continuously measures and stores pressure data points when the vehicle or apparatus is turned-on;

wherein the sensor makes a final pressure measurement after the vehicle or apparatus is turned-off.

15. The system according claim 14, wherein the receiving device is configured to synchronize with the sensor and receive data therefrom; the receiving device includes a software application (APP) that compares the data received at any given time against the initial baseline pressure measurement in order to determine the filter element lifetime.

16. The system according to claim 15, wherein the receiving device calculates the filter element lifetime by adding together the initial baseline pressure measurement and the last pressure data measured when the vehicle or apparatus is turned-on, and then subtracting the final pressure measured when the vehicle or apparatus is turned off.

17. The system according to claim 15, wherein the system further comprises a display upon which the receiving device shows the results of the analyzed data to an end user.

18. The system according to claim 15, wherein the data received by the APP at any given time is recognized by the receiving device as being valid or is validated by the receiving device upon comparison with expected values.

* * * * *